United States Patent
Lee et al.

(10) Patent No.: US 10,396,958 B2
(45) Date of Patent: *Aug. 27, 2019

(54) METHOD AND DEVICE FOR TRANSMITTING AND RECEIVING CHANNEL STATE INFORMATION IN DOWNLINK COORDINATED MULTI-POINT SYSTEM

(71) Applicant: Samsung Electronics Co., Ltd, Gyeonggi-do (KR)

(72) Inventors: Hyo Jin Lee, Seoul (KR); Youn Sun Kim, Gyeonggi-do (KR); Ki Il Kim, Gyeonggi-do (KR); Ju Ho Lee, Gyeonggi-do (KR); Joon Young Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

This patent is subject to a terminal disclaimer.

(21) Appl. No.: 15/484,029

(22) Filed: Apr. 10, 2017

(65) Prior Publication Data

US 2017/0222777 A1    Aug. 3, 2017

Related U.S. Application Data

(63) Continuation of application No. 14/376,378, filed as application No. PCT/KR2013/000846 on Feb. 1, 2013, now Pat. No. 9,621,318.
(Continued)

(51) Int. Cl.
*H04L 5/00* (2006.01)
*H04B 7/024* (2017.01)
(Continued)

(52) U.S. Cl.
CPC ........... *H04L 5/0053* (2013.01); *H04B 7/024* (2013.01); *H04B 7/0456* (2013.01); *H04B 7/063* (2013.01);
(Continued)

(58) Field of Classification Search
CPC ..... H04L 5/0053; H04L 5/0032; H04B 7/024; H04B 7/0456; H04B 7/0617;
(Continued)

(56) References Cited

U.S. PATENT DOCUMENTS

2012/0218913 A1    8/2012  Park et al.
2013/0003788 A1    1/2013  Marinier et al.
(Continued)

FOREIGN PATENT DOCUMENTS

EP    2698940 A1    2/2014
KR    10-2009-0076322    7/2009
(Continued)

OTHER PUBLICATIONS

International Search Report dated May 15, 2013 in connection with International Patent Application No. PCT/KR2013/000846, 5 pages.
(Continued)

*Primary Examiner* — Obaidul Huq

(57) ABSTRACT

The present invention relates to a method and device for transmitting and receiving CSI (Channel State Information). A CSI transmission method at a CoMP (Coordinated Multi-Point) device includes steps of receiving a CSI-RS (Reference Signal) from a plurality of transmission points, acquiring an optimal phase difference value causing an optimal channel quality between the plurality of transmission points, based on the CSI-RS, acquiring a CQI (Channel Quality Indicator), based on the optimal phase difference value, and transmitting the CSI including the CQI. According to an embodiment of the present invention, efficient CSI trans-
(Continued)

mission/reception method and device can be provided in a CoMP system.

12 Claims, 12 Drawing Sheets

Related U.S. Application Data

(60) Provisional application No. 61/593,411, filed on Feb. 1, 2012.

(51) Int. Cl.
   *H04B 7/0456* (2017.01)
   *H04B 7/06* (2006.01)

(52) U.S. Cl.
   CPC ........... *H04B 7/068* (2013.01); *H04B 7/0617* (2013.01); *H04B 7/0626* (2013.01); *H04B 7/0632* (2013.01); *H04B 7/0639* (2013.01); *H04L 5/0032* (2013.01)

(58) Field of Classification Search
   CPC .... H04B 7/0626; H04B 7/063; H04B 7/0632; H04B 7/0639; H04B 7/068
   USPC ......................................... 370/310, 328, 329
   See application file for complete search history.

(56) References Cited

U.S. PATENT DOCUMENTS

| | | |
|---|---|---|
| 2013/0021925 A1 | 1/2013 | Yin et al. |
| 2013/0083681 A1 | 4/2013 | Ebrahimi Tazeh Mahalleh et al. |
| 2013/0122953 A1* | 5/2013 | Zhang .................. H04W 24/02 455/517 |
| 2014/0029465 A1 | 1/2014 | Nagata et al. |
| 2014/0133343 A1 | 5/2014 | Lee et al. |

FOREIGN PATENT DOCUMENTS

| | | |
|---|---|---|
| KR | 10-2010-0130846 | 12/2010 |
| KR | 10-2011-0048422 | 5/2011 |
| WO | WO 2010/140860 A2 | 12/2010 |
| WO | WO 2011/053084 A2 | 5/2011 |
| WO | WO 2011/085516 A1 | 7/2011 |

OTHER PUBLICATIONS

Written Opinion of International Searching Authority dated May 15, 2013 in connection with International Patent Application No. PCT/KR2013/000846, 4 pages.

Nokia Siemens Networks, "CQI for R11 CoMP with CRS and CSI-RS based feedback", 3GPP TSG-RAN WG1 Meeting #67, San Francisco, November Oct. 14, 2011, 2 pages.

Extended European Search Report dated Aug. 18, 2015 in connection with European Patent Application No. 13743258.9, 8 pages.

3GPP TSG RAN WG1 Meeting #67; "Consideration on CSI feedback for CoMP and feeback container" LG Electronics; R1-113982; San Francisco, USA; Nov. 14-18, 2011; 5 pages.

3GPP TSG RAN WG1 Meeting #67; "CSI Feedback Mechanism for Multiple Transmission Points" Samsung; R1-114224; San Francisco, USA; Nov. 14-18, 2011; 5 pages.

State Intellectual Property Office of the P.R.C., "First Office Action," Application No. 201380017631.8, Nov. 18, 2011, 17 pages, publisher SIPO, Beijing Shi, China.

NTT Docomo, "CSI Feedback Scheme for Rel-11 CoMP", 3GPP TSG RAN WG1 Meeting #68, Feb. 6-10, 2012, 7 pages, R1-120404.

Huawei, HiSilicon, "Framework for multi-point CSI feedback enhancements for CoMP", 3GPP TSG RAN WG1 meeting #66bis, Oct. 10-14, 2011, 9 pages, R1-112896.

Office Action dated Jan. 26, 2019 in connection with Korea Patent Application No. 10-2014-7021568, 8 pages.

Korean Intellectual Property Office, "Decision of Patent," Application No. KR 10-2014-7021568, Apr. 26, 2019, 4 pages.

Fujitsu, "Consideration on CSI Feedback to support DL CoMP," R1-114180, 3GPP TSG RAN WG1 Meeting #67, San Francisco, USA, Nov. 14-18, 2011, 5 pages.

\* cited by examiner

METHOD AND DEVICE FOR TRANSMITTING AND RECEIVING CHANNEL STATE INFORMATION IN DOWNLINK COORDINATED MULTI-POINT SYSTEM

CROSS-REFERENCE TO RELATED APPLICATIONS

The present application is a continuation of U.S. patent application Ser. No. 14/376,378 filed on Aug. 1, 2014, which claims priority under 35 U.S.C. § 365 to International Patent Application No. PCT/KR2013/000846 filed Feb. 1, 2013, entitled "METHOD AND DEVICE FOR TRANSMITTING AND RECEIVING CHANNEL STATE INFORMATION IN DOWNLINK COORDINATED MULTI-POINT SYSTEM". International Patent Application No. PCT/KR2013/000846 claims priority under 35 U.S.C. § 365 and/or 35 U.S.C. § 119(e) to U.S. Provisional Patent Application No. 61/593,411 filed Feb. 1, 2012, and which are incorporated herein by reference into the present disclosure as if fully set forth herein.

Method and device for transmitting and receiving channel state information in downlink coordinated multi-point system

TECHNICAL FIELD

The present invention relates to a method and device for transmitting and receiving CSI (Channel State Information) in a CoMP (Coordinated Multi-Point) communication system.

BACKGROUND ART

A communication system includes DL (DownLink) and UL (UpLink). The downlink is a connection for delivering signals from one or more TPs (Transmission Points) to UEs (User Equipments). The uplink is a connection for delivering signals from UEs to one or more RPs (Reception Points). Normally, UE is also referred to as a terminal or a mobile station. UE may be a fixed type or a mobile type. For example, UE may include a wireless device, a cellular phone, or a personal computing device. In general, TP or RP is a fixed station. TP and RP may be formed as a single integrated apparatus, which may be referred to as a base station. Also, this base station may be referred to as a BTS (Base Transceiver System), a node B, an eNB (enhanced Node B), an AP (Access Point), or the like.

A communication system supports the transmission of several signal types including a data signal, a control signal and a reference signal. A data signal delivers information contents. A control signal allows an appropriate processing of data signals. A reference signal is also referred to as a pilot, and allows a coherent demodulation of data or control signals. Once a reference signal is transmitted, channel state information (CSI) corresponding to an estimated value of a channel medium may be created.

UL data information is delivered through PUSCH (Physical Uplink Shared CHannel). UCI (Uplink Control Information) is delivered through PUCCH (Physical Uplink Control CHannel), except case in which UE has PUSCH transmission, and UE can deliver at least part of UCI as well as data information through the PUSCH. UCI includes ACK (ACKnowledgement) information associated with use of HARQ (Hybrid Automatic Repeat reQuest) process. HARQ-ACK is a response to reception of TBs (Transmission Blocks) by UE at DL of a communication system, and this corresponds to signal transmission from a node B to UE.

DL TBs are transmitted through PDSCH. UCI may include a CQI (Channel Quality Indicator), a PMI (Precoding Matrix Indicator), or an RI (Rank Indicator). CQI, PMI and RI may be collectively referred to as CSI (Channel State Information). CQI offers, to a node B, a measured value of SINR (Signal to Interference and Noise Ratio) experienced by UE through sub-bands or the entire operating DL BW (BandWidth). Typically, this measured value is the form of the maximum MCS (Modulation and Coding Scheme) that can be achieved by a predetermined BLER (BLock Error Rate) about transmission of TBs. Through PMI/RI, a node B may be notified of a method for combining signal transmission from UE to node B antennas according to MIMO (Multiple-Input Multiple-Output) mode. UE can transmit UCI through PUCCH separately from data information. Alternatively, UE may transmit UCI through PUSCH together with data information.

DL data information is delivered through PDSCH. DCI (Downlink Control Information) includes a DL CSI feedback request to UEs, UL SAs (Scheduling Assignments) about PUSCH transmission to UEs, or DL SAs about PDSCH reception by UEs. SAs are delivered through DCI formats transmitted through respective PDCCHs (Physical Downlink Control CHannels). In addition to SAs, PDCCHs may deliver DCI common to all UEs or one group of UEs.

Additionally, DCI includes HARQ-ACK information transmitted to UEs by one or more TPs through PHICHs (Physical HARQ-ACK Indicator CHannels) in response to reception of data TBs transmitted from UEs to RPs.

Typically, PDCCHs are major parts of a total DL overhead. One method for reducing this overhead is to scale down its size according to resources required for transmission of PDCCHs and PHICHs. If OFDMA (Orthogonal Frequency Division Multiple Access) is used as a DL transmission method, a CCFI (Control Channel Format Indicator) parameter may be transmitted through PCFICH (Physical Control Format Indicator CHannel) and represent the number of OFDM symbols allocated to a DL control region during DL TTI (Transmission Time Interval).

FIG. 1 shows a structure of a control region in DL TTI.

In FIG. 1, a single subframe is composed of M symbols. Referring to FIG. 1, a DL control region occupies the first N subframe symbols 110. The rest M-N subframe symbols 120 are assumed to be used mainly for PDSCH transmission. PCFICH 130 is transmitted at some sub-carriers of the first symbol. Sub-carriers are also referred to as resource elements (REs). It is supposed that PCFICH delivers two bits that represent a PDCCH size of subframe symbols (M=1, 2, or 3). Additionally, PHICH 140 is transmitted at some REs of the first subframe symbol. Further, some subframe symbols include RS REs 150 and 160 common to all UEs with regard to each of transmission antennas assumed to be two in FIG. 1. The central aim of UE-CRS (Common RS) is to allow UE to acquire a channel estimation value about a DL channel medium and also to perform other measurements and functions well known in the art. The rest REs in the DL control region are used for transmission of PDCCH.

PDCCH which delivers SAs is not transmitted at a predetermined location of the DL control region. As a result, each UE should perform a plurality of decoding operations so as to determine whether there is SA in a DL subframe. In order to assist such decoding operations of UE, REs that deliver respective PDCCHs are grouped into CCEs (Control Channel Elements) in the logical domain. Regarding a given number of DCI format bits, the number of CCEs for DCI format transmission depends on a channel coding rate (assuming QPSK (Quadrature Phase Shift Keying) is a modulation type). For UEs that experience lower or higher SINR in DL, serving TPs may use a lower or higher channel coding rate about PDCCH transmission so as to achieve a desired BLER. Therefore, PDCCH transmission to UE experiencing a lower DL SINR may often require much more CCEs than RDCCH transmission to UE experiencing a higher DL SINR does (different power boosting may be also used for REs of CCE transmission). Normal CCE aggregation levels for PDCCH transmission are, for example, one, two, four, and eight CCEs.

Regarding PDCCH decoding process, UE may determine a search space for candidate PDCCHs after CCEs are restored in the logical domain, depending on a common set of CCEs for all UEs (UE-CSS (Common Search Space)) or a UE dedicated set of CCEs (UE-DSS (Dedicated Search Space)). UE-CSS may be formed of the first $N_{CCE}^{UE\text{-}CSS}$ CCEs in the logical domain. UE-DSS may be determined according to a pseudo random function that has, as inputs, a UE common parameter such as the number of subframes or the number of total CCEs in a subframe, and a UE specific parameter such as UE identity (UE_ID).

For example, with regard to CCE aggregation level LE $\in\{1,2,4,8\}$, CCEs for PDCCH candidate m are given as $L\times\{(Y_k+m) \bmod(\text{floor}(N_{CCE,k}/L))\}+i$. Here, $N_{CCE,k}$ is the total number of CCEs in a subframe k. Also, i ranges from 0 to L−1. Also, m ranges from 0 to $M^{(L)}$−1. Also, $M^{(L)}$ is the number of PDCCH candidates for monitoring in a search space. Also, floor(x) is a function of returning the maximum integer smaller than or equal to x. Meanwhile, floor(x) may be expressed as $\lfloor x \rfloor$. Two expressions will be used together hereinafter. Exemplary values of $M^{(L)}(L\in\{1,2,4,8\})$ are $\{0, 0, 4, 2\}$ in UE-CSS and $\{6, 6, 2, 2\}$ in UE-DSS. For UE-CSS, $Y_k=0$. For UE-DSS, $Y_k=(A\times Y_{k-1}) \bmod(D)$, where $Y_{-1}=\text{UE\_ID}\neq 0$, A=39827, and D=65537.

For example, PDCCHs which deliver information to a plurality of UEs, such as PDCCH which delivers TPC (Transmission Power Control) commands for UEs so as to regulate PUSCH or PUCCH transmission power, are transmitted at UE-CSS. Additionally, if there are sufficient CCEs in UE-CSS after transmission of PDCCHs which deliver DCI to UEs at a subframe, UE-CSS may be also used for transmitting PDCCH which delivers some SAs having specific DCI formats. UE-DSS is used exclusively only for transmitting PDCCHs which offer SAs. For example, UE-CSS may be formed of 16 CCEs, and hence support two PDCCHs having CCEs of L=8, support four PDCCHs having CCEs of L=4, support one two PDCCHs having CCEs of L=8, or support two PDCCHs having CCEs of L=4. CCEs for UE-CSS are disposed first in the logical domain (before interleaving).

FIG. 2 shows a PDCCH transmission process.

Referring to FIG. 2, after channel coding and rate matching, encoded bits of DCI formats are mapped to CCEs in the logical domain. The first four CCEs (L=4), i.e., CCE1 201, CCE2 202, CCE3 203, and CCE4 204, are used for PDCCH transmission to UE1. The next two CCEs (L=2), i.e., CCE5 211 and CCE6 212, are used for PDCCH transmission to UE2. The next two CCEs (L=2), i.e., CCE7 221 and CCE8 222, are used for PDCCH transmission to UE3. Finally, the last CCE (L=1), i.e., CCE9 231, is used for PDCCH transmission to UE4. At step 240, DCI format bits of PDCCH may be scrambled with a binary scrambling code. Scrambled DCI format bits are modulated at step 250. Each CCE is further divided into REGs (Resource Element Groups). For example, CCE formed of 36 REs may be divided into 9 REGs, each of which is formed of 4 REs. At step 260, interleaving is applied to REGs (blocks of four QPSK symbols). For example, block interleaving that interleaving is performed for symbol-quadruplets (4 QPSK symbols corresponding to 4 REs of REG) instead of individual bits may be used. After REG interleaving, consequence series of QPSK symbols may be shifted by J symbols at step 270. Finally, at step 280, each QPSK symbol is mapped to RE in a DL control region of subframe. This mapping is made first in a frequency direction and then made in a time direction. Therefore, in addition to RS 291 and 292 from transmission antennas and other control channels such as PCFICH or PHICH 293, REs in a DL control includes QPSK symbols corresponding to DCI format for UE1 294, UE2 295, UE3 296 and UE4 297.

FIG. 3 shows exemplarily a PUSCH transmission structure. For simplicity, TTI is formed of a single subframe 310 including two slots. Each slot 320 contains $N_{symb}^{UL}$ symbols used for transmission of data signals, UCI signals, or reference signals (RS). Each symbol 330 relieves interference due to channel propagation effects, including CP (Cyclic Prefix). PUSCH transmission in one slot may use the same BW as or different BW from PUSCH transmission in the other slot. Some symbols in each slot are used for transmission of RS 340 that allows coherent demodulation and channel estimation of received data and/or UCI signals. Transmission BW is formed of frequency resource units which are referred to as PRBs (Physical Resource Blocks). Each PRB is formed of $N_{SC}^{RB}$ sub-carriers or resource elements (REs), and UE is allocated $M_{PUSCH}$ PRBs 350 for total $M_{SC}^{PUSCH}=M_{PUSCH}\times N_{SC}^{RB}$ with regard to PUSCH transmission BW. The last subframe symbol may be used for transmission of SRS (Sounding RS) 360 from one or more UEs. The central aim of SRS is to offer a CQI estimation value to a node B for UL channel medium regarding each UE. SRS transmission parameters for each UE are formed semi-statically by a node B through upper layer signaling. The number of subframe symbols capable of being used for data transmission is $N_{symb}^{PUSCH}=2(N_{symb}^{UL}-1)-N_{SRS}$. Here, $N_{SRS}=1$ if the last subframe symbol is used for SRS transmission, and $N_{ms}=0$ in the other case.

FIG. 4 is a block diagram of a PUSCH transmitter. A multiplexer 420 multiplexes coded CSI bits 405 and coded data bits 410. Then, an HARQ-ACK insertion unit 430 punctures data bits and/or CSI bits and inserts HARQ-ACK bits. Then, a DFT unit 440 performs DFT (Discrete Fourier Transform) of data into which HARQ-ACK bits are inserted. A mapping unit 450 selects (mapping) REs corresponding to PUSCH transmission BW, and a transmission BW control unit 455 controls transmission BW. An IFFT unit 460 performs IFFT (Inverse Fast Fourier Transform) of mapping signals. Finally, a CP insertion unit 470 inserts CP into IFFTed signals. A time windowing unit 480 performs filtering. A filtered transmission signal 490 is delivered to a receiver. For simplicity, additional transmitter circuitry such as a digital-analog converter, analog filters, amplifiers, and transmitter antenna is not illustrated. Also, for simplicity, an encoding process for data bits and CSI bits as well as a modulation process for all transmission bits are omitted. It is supposed that PUSCH transmission is made on clusters of adjacent REs or a plurality of non-adjacent clusters 495B according to DFT-S-OFDM (DFT Spread Orthogonal Frequency Multiple Access) method (or also referred to as SC-FDMA (Single-Carrier Frequency Division Multiple Access)) allowing signal transmission through one cluster 495A.

FIG. 5 is a block diagram of a receiver. In the receiver, reverse (complementary) operations of transmitter operations are performed. Reverse operations of operations shown in FIG. 4 are shown in FIG. 5. After an antenna receives a radio frequency (RF) analog signal, and after processing of additional processing units (such as filters, amplifiers, frequency lowering converters, and analog-digital converters) not shown for simplicity, a time windowing unit 520 filters a received signal 510. A CP elimination unit 530 removes CP from the filtered signal. Then, an FFT unit 540 applies FFT to the CP-removed signal. A demapping unit 550 selects (demapping) REs 560 used by the transmitter. An IDFT unit 570 applies IDFT to the demapped signal. An ACK/NAK extraction unit 570 extracts ACK/NAK. A demultiplexing unit 580 demultiplexes data bits 590 and CSI bits 595. Like the transmitter, well-known receiver functions such as channel estimation, demodulation, and decoding are not illustrated for simplicity.

In order to support a higher data rate than what is available in legacy communication systems, a plurality of CCs (Component Carriers) (also referred to as CA (Carrier Aggregation)) are considered in both DL and UL and thereby offer higher operating BWs. For example, in order to support a communication through 60 MHz, an aggregation of three 20 MHz CCs may be used.

FIG. 6 shows the principle of CC aggregation. An operating DL BW 610 of 60 MHz is formed of an aggregation of three DL CCs 621, 622 and 623 (shown as continuity for simplicity) each of which has 20 MHz BW. Similarly, an operating UL BW 630 of 60 MHz is formed of an aggregation of three UL CCs 641, 642 and 643 each having 20 MHz BW. For simplicity, it is supposed in FIG. 6 that each DL CC is mapped inherently to UL CC (symmetric CC aggregation). However, it is possible to map two or more DL CCs to a single UL CC or to map two or more UL CCs to a single DL CC (non-symmetric CC aggregation not shown for simplicity). Typically, links between DL CCs and UL CCs are UE-specified type.

A node B forms CCs for UE, using upper layer signaling such as, e.g., RRC (Radio Resource Control) signaling. DL CCs formed by RRC may be activated or inactivated by MAC (Medium Access Control) signaling or physical layer signaling (Activation/inactivation of UL CC formed by each RRC is determined depending on activation/inactivation of linked DL CC). The activation of DL (UL) CC for UE means that UE can receive PDSCH (transmit PUSCH) at the CC, and the reverse is applied to the inactivation of DL (UL) CC. To maintain a communication, one DL CC and one UL CC linked thereto are needed to remain in an activation state, and these will be referred to as DL PCC (DL Primary CC) and UL PCC (UL Primary CC), respectively.

An aperiodic CSI report through PUSCH is triggered by a CSI request field in PDCCH. In the following description, a serving cell corresponds to each component carrier (CC). When a transmitted display is decoded in scheduling allowed for a serving cell (c), an aperiodic CSI report is performed using PUSCH on the serving cell (c). If the size of a CSI request field is one bit, a report is triggered in case the CSI request field is set to '1'. If the size of a CSI request field is two bits, a report is triggered according to Table 1 given below.

TABLE 1

| Value of CSI Request Field | Description |
| --- | --- |
| '00' | No aperiodic CSI report is triggered |
| '01' | Aperiodic CSI report is triggered for a serving cell (c) |
| '10' | Aperiodic CSI report is triggered for the first set of serving cells formed by upper layers |
| '11' | Aperiodic CSI report is triggered for the second set of serving cells formed by upper layers |

For example, in case a carrier indicator field (CIF) is 1 (bit '001') and a CSI request field is bit '01', CSI of DL CC1 linked to UL CC1 feeds back to a node B due to CIF. In case a CSI request field is bit '10', CSI(s) of DL CC(s) feeds back to a node B, depending on upper layer configuration.

FIG. 7 shows a resource structure of LTE-A. DL transmission of LTE and LTE-A are implemented by the subframe in the time domain and by the RB in the frequency domain. While subframe is equal to 1 msec of a transmission period, RB is equal to 180 kHz of a transmission bandwidth formed of 12 sub-carriers. As shown in FIG. 7, a system bandwidth of LTE-A is formed of a plurality of RBs in the frequency domain and formed of a plurality of subframes in the time domain.

Many different signals are transmitted for LTE-A release 10 and the next releases. In DL, the following reference signals are transmitted:

1. Cell-specific reference signal (CRS): Used for initial system access, paging, PDSCH demodulation, channel measurement, handover, or the like.

2. Demodulation reference signal (DMRS): Used for demodulation of PDSCH

3. Channel state information reference signal (CSI-RS): Used for channel measurement.

In addition to the above reference signals, zero power CSI-RS may be applied to LTE-A release 10. Zero power CSI-RS may occur at the same time and frequency resources as CSI-RS does, but may be different from CSI-RS in that there is no signal transmitted onto REs dependent on zero power CSI-RS. The aim of zero power CSI-RS is not to create interference on CSI-RS transmitted by adjacent TPs through no transmission onto resources used by adjacent TPs for CSI-RS transmission of specific TP.

FIG. 8 is a configuration diagram of resources in LTE or LTE-A system. Referring to FIG. 8, the locations of resources used for transmission of different reference signals, PDSCH, zero power CSI-RS, and control channels are shown. It should be noted that FIG. 8 relates to a single RB in the frequency domain and to a single subframe in the time domain. A plurality of RBs may exist for each subframe, and the above signals may be transmitted on a plurality of RBs in a similar manner as shown in FIG. 8. Resources marked with alphabets A, B, C, D, E, F, G, H, I and J in FIG. 8 correspond to the locations where transmission for CSI-RS has four antenna ports. For example, in four REs marked with 'A', CSI-RS having four antenna ports may be transmitted. CSI-RS having two antenna ports may be transmitted on resources acquired by restricting resources for CSI-RS having four antenna ports to two. Additionally, CSI-RS having eight antenna ports may be transmitted on resources acquired by combining two resources for CSI-RS having four antenna ports. Zero power CSI-RS may be applied to resources for CSI-RS having four antenna ports.

In DL transmission mode 9 of 3GPP LTE-A release 10, UEs measure CSI-RS transmitted by eNB, and also create and feed back a DL CSI such as RI (Rank Indicator), PMI (Precoding Matrix Indicator), and CQI (Channel Quality Indicator). Each of RI, PMI and CQI is reported at individual timing displayed by eNB. In a CSI feedback, PMI is calculated on the basis of the most recently reported RI, and CQI is calculated by assuming the most recently reported RI and PMI.

The central aim of communication systems is to improve a coverage and cell-edge throughput. CoMP (Coordinated Multi-Point) transmission/reception is an important technique for achieving this aim. In case UE is in a cell-edge region, CoMP operation depends on the fact that it can reliably receive signals from a set of TPs (DL CoMP) and also reliably transmit signals to a set of RPs (UL CoMP). DL CoMP methods may include more complicated methods that require exact and detailed channel information, such as joint transmission from a plurality of TPs, as well as a simple method of interference avoidance such as adjusted scheduling. Additionally, UL CoMP methods may include more complicated methods of considering received signal characteristics and created interference at a plurality of RPs as well as a simple method of performing PUSCH scheduling in consideration for a single RP.

DISCLOSURE OF INVENTION

Technical Problem

The present invention is proposed to solve the above drawbacks and has the aim of providing a method and device of allowing an effective CSI feedback in a CoMP system.

Solution to Problem

In order to solve the above drawbacks, a CSI (Channel State Information) transmission method at a CoMP (Coordinated Multi-Point) device according to one embodiment of the present invention may include steps of receiving a CSI-RS (Reference Signal) from a plurality of transmission points; acquiring an optimal phase difference value causing an optimal channel quality between the plurality of transmission points, based on the CSI-RS; acquiring a CQI (Channel Quality Indicator), based on the optimal phase difference value; and transmitting the CSI including the CQI.

In order to solve the above drawbacks, a CoMP (Coordinated Multi-Point) device for transmitting CSI (Channel State Information) according to one embodiment of the present invention may include a transceiver unit configured to receive a CSI-RS (Reference Signal) from a plurality of transmission points; and a feedback creation unit configured to acquire an optimal phase difference value causing an optimal channel quality between the plurality of transmission points, based on the CSI-RS, and to acquire a CQI (Channel Quality Indicator), based on the optimal phase difference value. The transceiver unit may be further configured to transmit the CSI including the CQI.

Advantageous Effects of Invention

According to one embodiment of the present invention, effective CSI transmission/reception method and device can be provided in a CoMP system.

MODE FOR THE INVENTION

Figure 1:
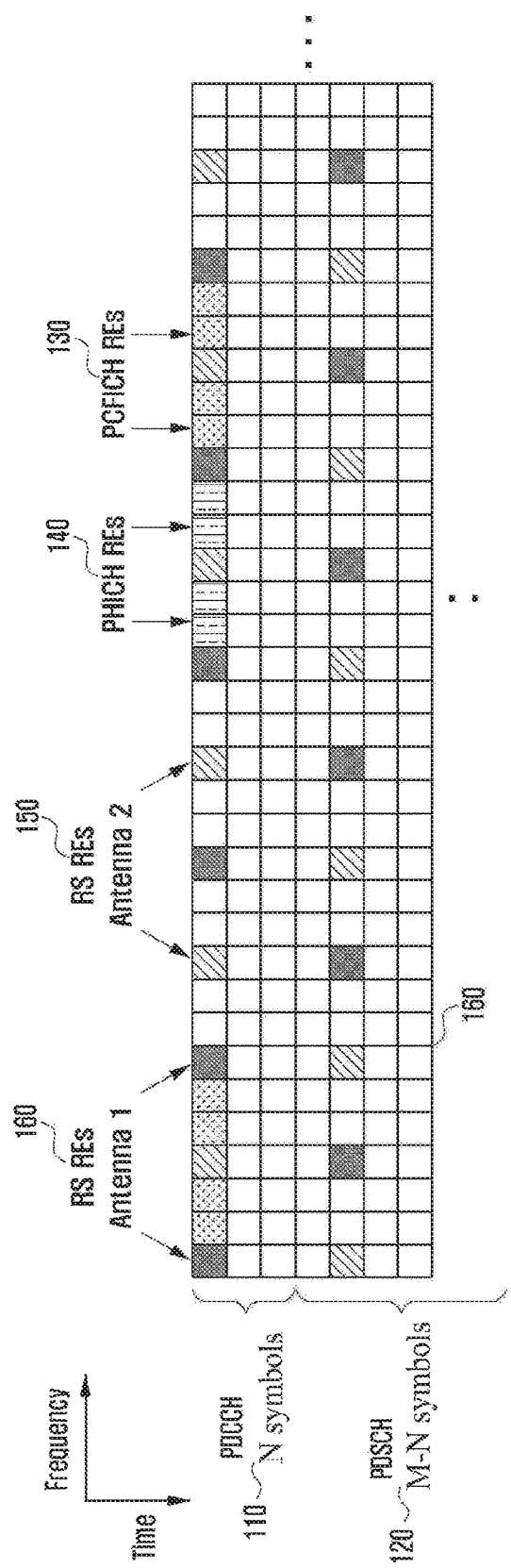
FIG. 1 shows a structure of a control region in DL TTI.
Figure 2:
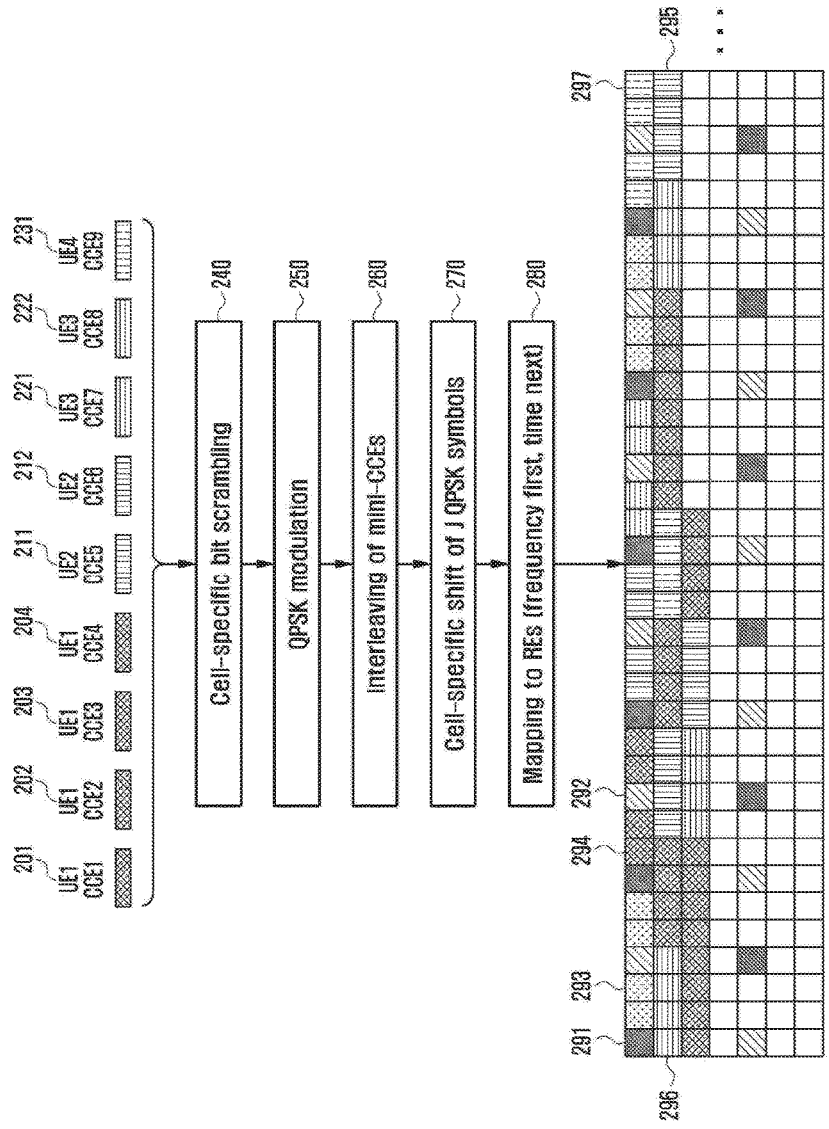
FIG. 2 shows a PDCCH transmission process.
Figure 3:
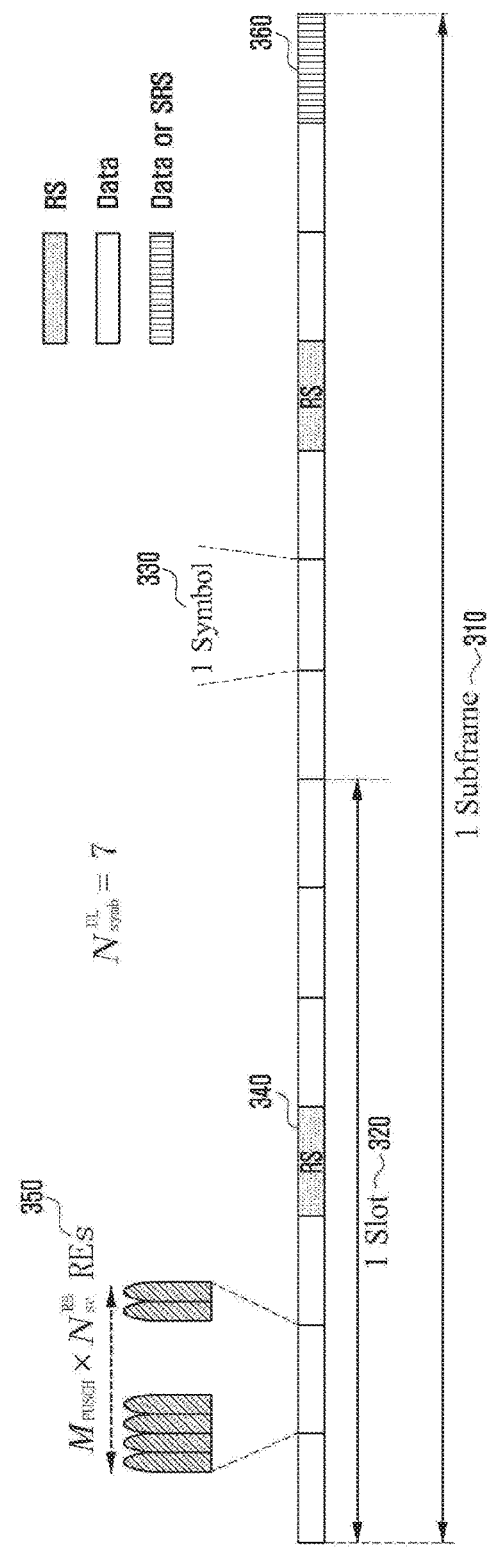
FIG. 3 shows exemplarily a PUSCH transmission structure.
Figure 4:
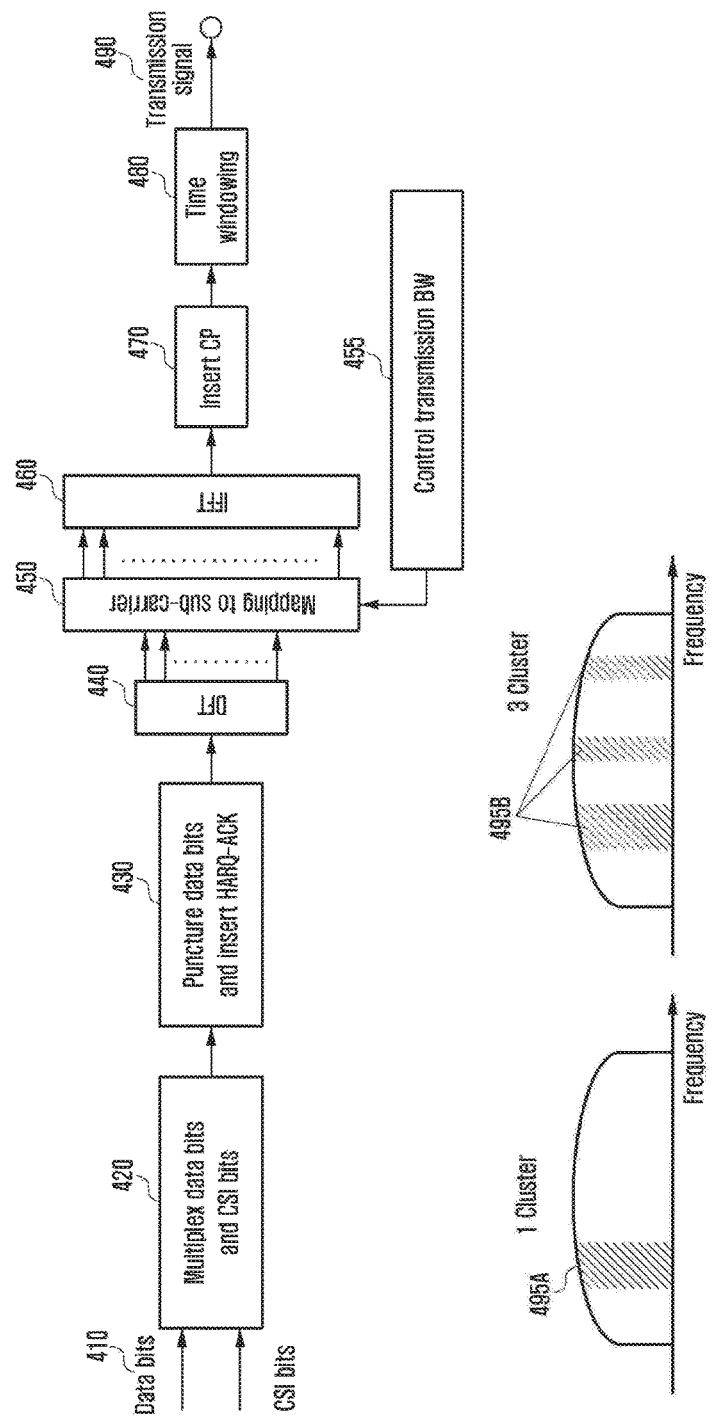
FIG. 4 is a block diagram of a PUSCH transmitter.
Figure 5:
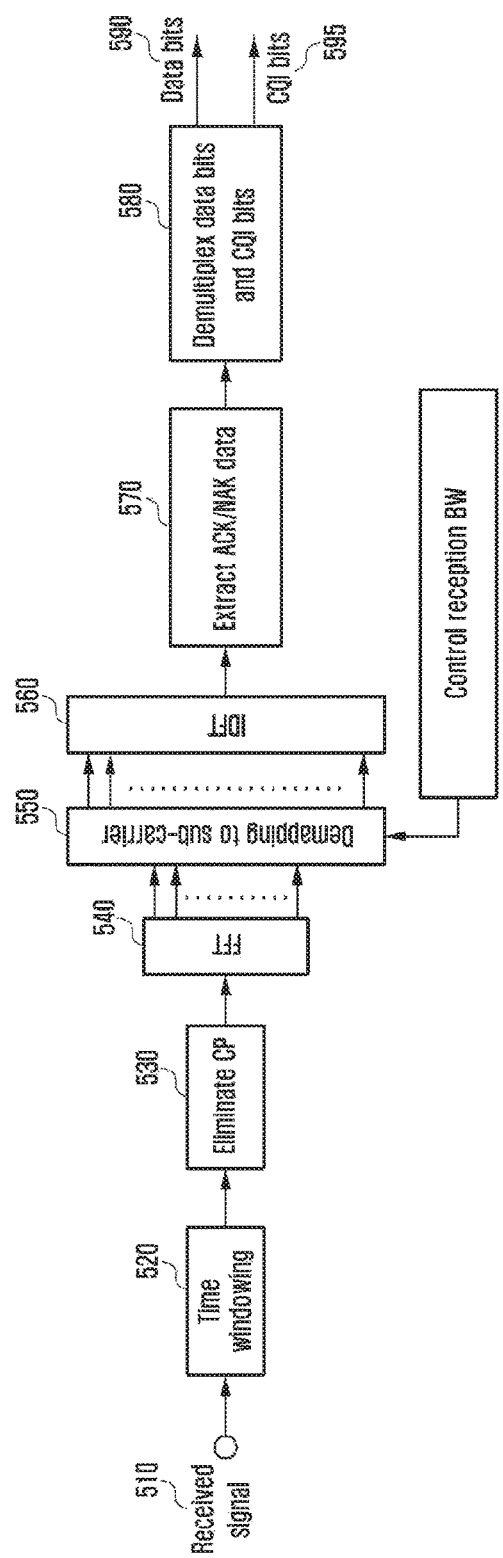
FIG. 5 is a block diagram of a receiver.
Figure 6:
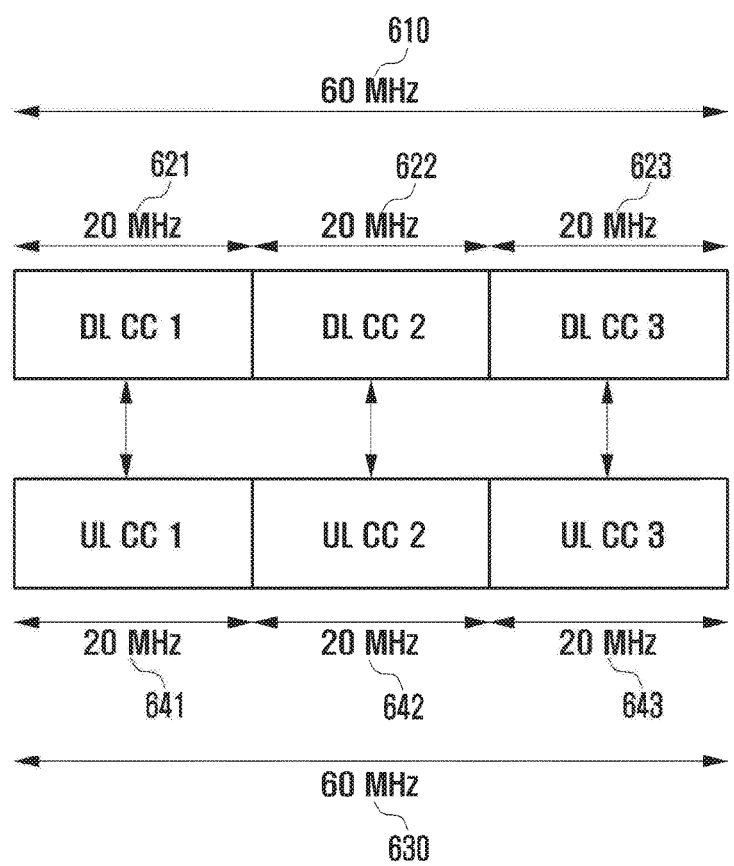
FIG. 6 shows the principle of CC aggregation.
Figure 7:
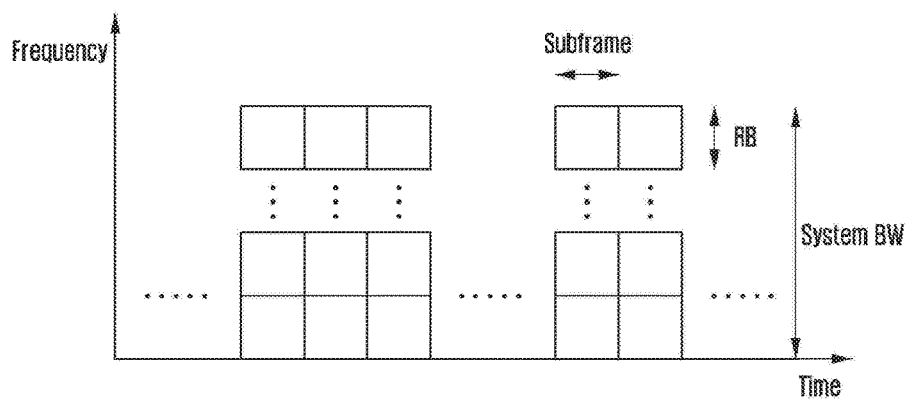
FIG. 7 shows a resource structure of LTE-A.
Figure 8:
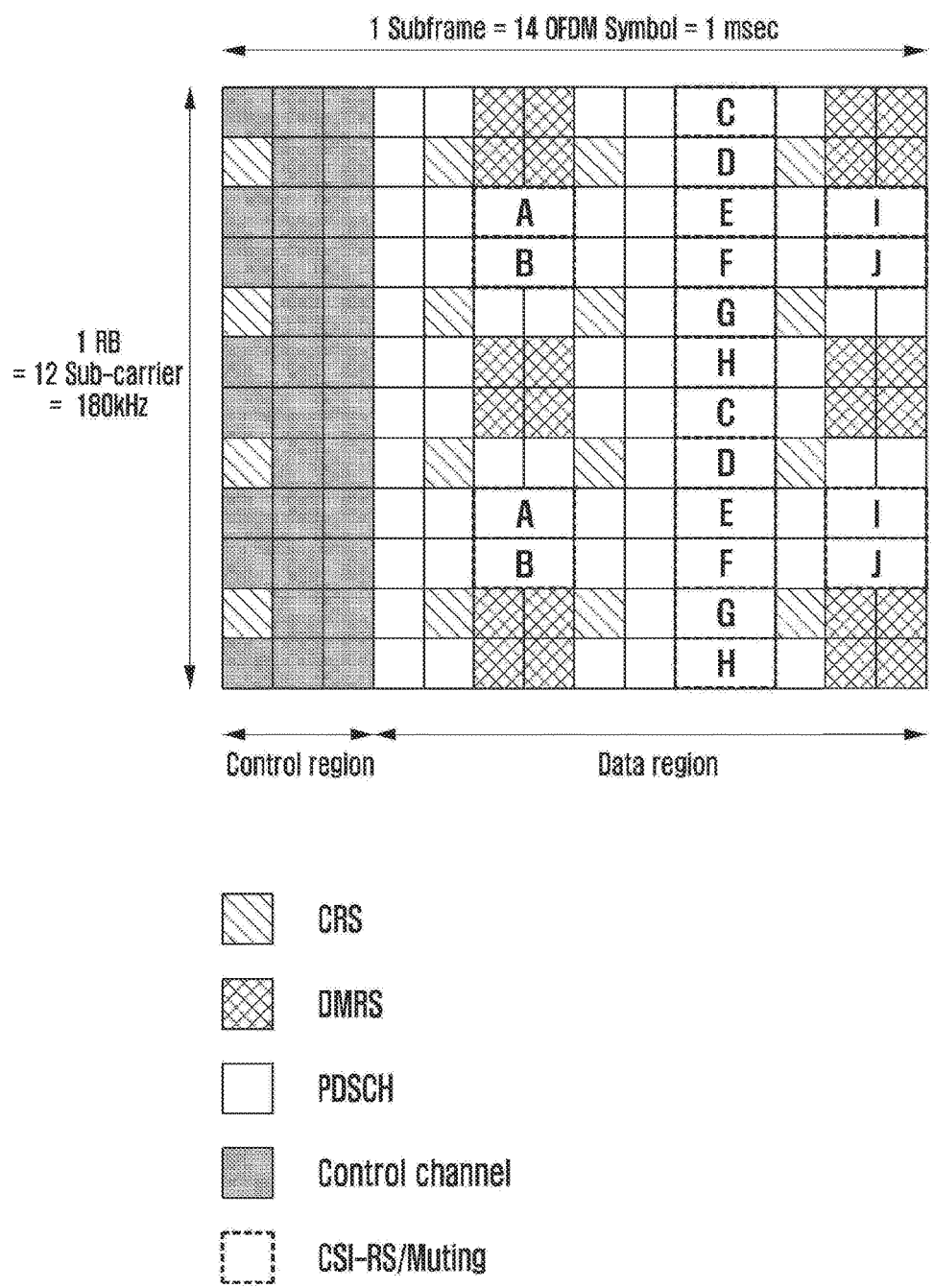
FIG. 8 is a configuration diagram of resources in LTE or LTE-A system.

A new CSI feedback for various CoMP methods is introduced for supporting DL CoMP. A conventional CSI feedback method considers only one transmission point (TP) and one CSI reference signal for a channel measurement and a CSI feedback report. It is therefore impossible for a conventional CSI feedback method to support CoMP methods from a plurality of TPs that utilize a plurality of CSI reference signals. For this reason, a new CSI feedback for a plurality of TPs (or a CSI feedback for corresponding CSI-RS configurations) is required to support DL CoMP methods.

Feedback for CoMP Methods may be Classified as Follows.
   1. A plurality of CSI reports for a plurality of TPs
   1-1. For a CSI report, a node B forms a plurality of CSI-RS configurations for UE.
   1-2. Each CSI-RS configuration corresponds to a specific TP.
   1-2-1. It is allowed that one CSI-RS configuration corresponds to a plurality of TPs.
   1-3. A set of CSI-RS configurations for CSI reports (or corresponding TPs) is defined as "a CoMP measurement set".
   1-4. Each CSI report corresponds to a CSI-RS configuration for TP.
   2. Additional feedback for a dynamic point selection and dynamic blanking (DS/DB)
   2-1. Some TPs (e.g., macro node B) may be turned off (blanking) to assist DL data reception of UEs connected to other TPs.
   2-2. UE is required to feed back additional CSI for blanking.
   3. Additional feedback for joint transmission (JT)
   3-1. A plurality of TPs can simultaneously transmit data for one UE.
   3-2. JT may require additional CSI for joint transmission from a plurality of TPs.

A CSI report for CoMP may be transmitted at PUCCH separately from data information or at PUSCH together with data information. Therefore, it is needed to offer a CSI report for CoMP through each of PUSCH and PUCCH.

One basic feedback method for a plurality of CSI-RS configurations may be a feedback per-CSI-RS-resource that individually reports a channel state for a plurality of CSI-RS configurations. UEs create and feed back the CSI formed of CSI-RS resources for a plurality of TPs. In case of performing a feedback per-CSI-RS-resource, the CSI is individually applied to some or all of CSI-RS resources formed. For example, if a CoMP measurement set for UE is {CSI-RS-1, CSI-RS-2}, eNB may be signaling UE to create a CSI feedback for two individual feedback configurations.

Example 1

1. The first feedback configuration of UE: (mode 1-1, $N_{pd}$=10, $N_{OFFSET,CQI}$=0, $M_{RI}$=2, $N_{OFFSET,RI}$=−1, CSI-RS-1)
2. The second feedback configuration of UE: (mode 1-1, $N_{pd}$=10, $N_{OFFSET,CQI}$=2, $M_{RI}$=2, $N_{OFFSET,RI}$=−1, CSI-RS-2)

In Example 1, a mode 1-1 implies that a corresponding CSI feedback includes RI and broadband CQI/PMI. Report instances for broadband CQI/PMI are subframes that satisfy $(10 \times n_f + \text{floor}(n_s/2) - N_{OFFSET,CQI}) \mod N_{pd} = 0$. Here, $n_f$ is a system frame number, and $n_s = \{0, 1, \ldots, 19\}$ is a slot index in a frame. $N_{OFFSET,CQI}$ is a corresponding broadband CQI/PMI report offset (subframe unit), and $N_{pd}$ is a broadband CQI/PMI period (subframe unit). A reporting interval of RI report is an integer-multiple (MRI) of a broadband CQI/PMI period $N_{pd}$ (subframe unit). As discussed above, floor(x) is a function of returning the maximum integer smaller than or equal to x. Namely, report instances for RI are subframes that satisfy $(10 \times n_f + \text{floor}(n_s/2) - N_{OFFSET,CQI}) \mod (N_{pd} \times M_{RI}) = 0$. A report offset for RI $N_{OFFSET,RI}$ takes values from a set $\{0, -1, \ldots, -(N_p-1)\}$. In case RI and broadband CQI/PMI conflict with each other, broadband CQI/PMI is dropped.

Figure 9:
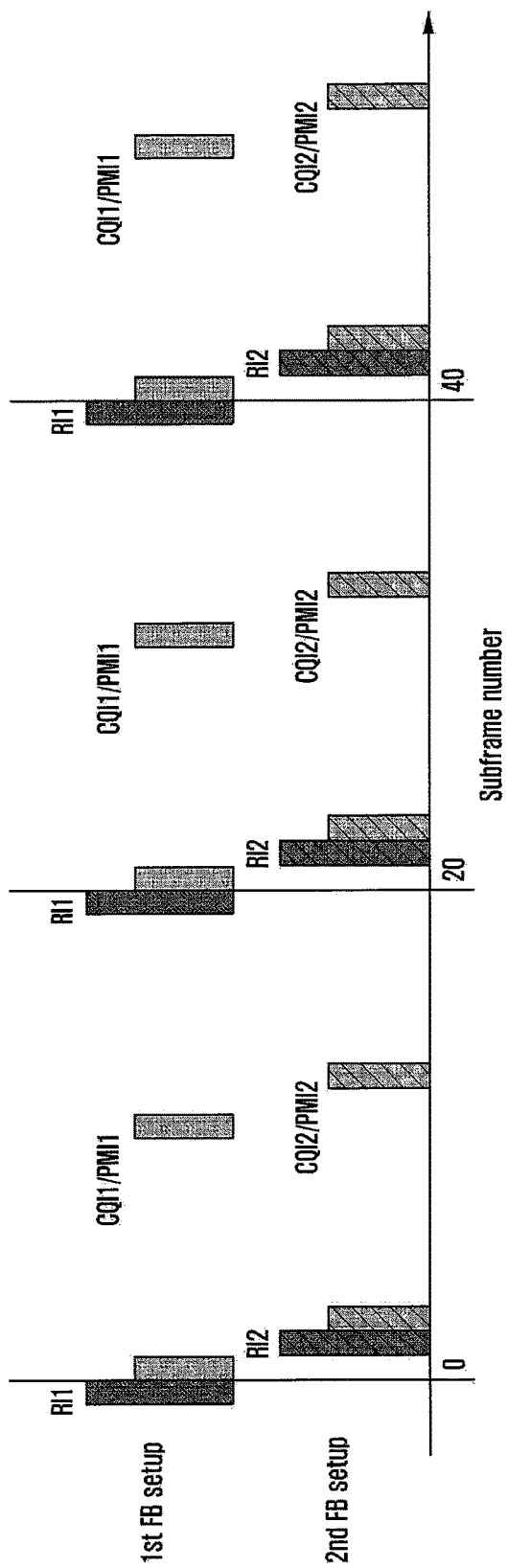
FIG. 9 shows CSI-RS and CSI in accordance with one embodiment of the present invention.

FIG. 9 shows CSI-RS and CSI in accordance with one embodiment of the present invention.

If JT is considered, additional CSI for joint transmission from a plurality of TPs may be supported at top of a feedback per-CSI-RS-resource. Namely, in case UEs are formed of CSI-RS resources for a plurality of TPs, UEs may additionally report CSI for an aggregation of CSI-RS resources such as added-up CQI and/or phase differences between TPs.

For example, if a CoMP measurement set for UE corresponding to TP-1 and TP-2 each having $N_1$ and $N_2$ antenna ports is {CSI-RS-1, CSI-RS-2}, individual CSI determined for two TPs is as follows:

1. A rank is one for both of TP-1 and TP-2.
2. Precoding matrixes are $P_1$ and $P_2$ for TP-1 and TP-2, respectively.

Here, $P_1$ and $P_2$ have sizes of $N_1 \times 1$ and $N_2 \times 1$ and corresponding PMIs of 1 and 2, respectively. Thereafter, on the assumption that a rank for JT is 1 and $(N_1+N_2) \times 1$ precoding matrix for JT is given as $$P_{JT}(\hat{\theta}) = \begin{bmatrix} P_1 \\ \hat{\theta} \cdot P_2 \end{bmatrix},$$

UE determines the optimal phase difference $\hat{\theta}$ for JT between two TPs, as Equation 1.

$$\hat{\theta} = \underset{\theta}{\operatorname{argmax}} \ f(P_{JT}(\theta)) \quad \text{[Equation 1]}$$

Here, f( ) is a function for DL performance receiving $P_{JT}(\theta)$ as an input, such as a function of capacity or effective SINR at UE. In case this phase difference is considered, it is noted that eNB indicates what TP is a reference TP in a CoMP measurement set. In this example, since TP-1 is a reference TP, phase difference $\hat{\theta}$ of TP-2 is calculated from a reference TP, i.e., TP-1. After calculating the optimal phase difference for JT, UE calculates CQI for JT on the assumption that precoding matrix $P_{JT}(\hat{\theta})$ is used for JT, and finally feeds back one or both of the following two values for JT:

1. Phase difference between TPs: $\hat{\theta}$
2. CQI for JT

If a phase difference is not used as feedback information, CQI for JT may be calculated and reported on the assumption that a rank for JT is 1 and precoder for JT is $$P_{JT}(1) = \begin{bmatrix} P_1 \\ P_2 \end{bmatrix}.$$

Since ranks for TP-1 and TP-2 are same in the above example, UE may easily calculate CSI for JT feedback on the assumption that a rank for JT has the same value as a rank for each TP has and precoding matrix is in the form of $$P_{JT}(\hat{\theta}) = \begin{bmatrix} P_1 \\ \hat{\theta} \cdot P_2 \end{bmatrix}.$$

However, generally, it is not guaranteed that ranks of all TPs in a CoMP measurement set of UE are always same. Therefore, hereinafter, case where individual ranks of TPs in a CoMP measurement set for UE are different from each other will be considered.

Let's suppose that a CoMP measurement set for UE is {CSI-RS-1, CSI-RS-2} corresponding to TP-1 and TP-2 having $N_1$ and $N_2$ antenna ports, respectively, and CSI determined for individual feedbacks is given.

1. Ranks are $r_1$ and $r_2$ for TP-1 and TP-2, respectively (unless otherwise noted, it is supposed that $r_1 \geq r_2$ without loss of generality and a reference TP is TP-1).
2. Precoding matrixes are $P_1$ and $P_2$ having sizes of $N_1 \times r_1$ and $N_2 \times r_2$ for TP-1 and TP-2, respectively.

Thereafter, UE may suppose that a rank $r_{JT}$ for JT between TP-1 and TP-2 is determined as the following Equation 2.

$$r_{JT} = \max(r_1, r_2) \quad \text{[Equation 2]}$$

The reason for determining a rank for JT as the maximum value of individual ranks for TPs is that JT offers more reliable channel conditions than transmission by individual TPs.

If a rank for JT feedback is determined according to Equation 2, precoding matrix for JT, $P_{JT}(\hat{\theta})$, may have a size of $(N_1+N_2) \times r_{JT}$ such that UE can find all or one of a phase difference for JT $\hat{\theta}$ and CQI. One method for configuring $(N_1+N_2) \times r_{JT}$ precoding matrix $P_{JT}(\theta)$ on the basis of individual precoding matrixes $P_1$ and $P_2$ is to stack these two matrixes and fill an empty place in $N2 \times (r_{JT}-R_2)$ components with predetermined matrix as shown in Equation 3.

$$P_{JT}(\theta) = \begin{bmatrix} P_1 \\ \theta \cdot [P_2, B_{N_2 \times (r_{JT}-r_2)}] \end{bmatrix} \quad \text{[Equation 3]}$$

Here, $B_{N_2 \times (r_{JT}-r_2)}$ matrix, and defined as $[P_2, B_{N_2 \times 0}] = P_2$. Possible candidates of $B_{N_2 33}$ $(r_{JT}-r_2)$ are as follows.

1. Zero matrix having a size of $N_2 \times (r_{JT}-r_2)$
2. One of $N_2 \times (r_{JT}-r_2)$ precoding matrixes in a codebook for a CSI report specified in 3GPP LTE-A release 10, for example, $N_2 \times (r_{JT}-r_2)$ precoding matrix having the minimum index In case of $r_1 < r_2$, $P_{JT}(\theta)$ may be the form of the following Equation 4.

$$P_{JT}(\theta) = \begin{bmatrix} \lfloor P_1, B_{N_1 \times (r_{JT}-r_1)} \rfloor \\ \theta \cdot P_2 \end{bmatrix} \quad \text{[Equation 4]}$$

Thereafter, on the assumption that a rank for JT is $r_{JT} = \max(r_1, r_2)$ and $(N_1+N_2) \times r_{JT}$ precoding matrix for JT is given, and on the assumption that the precoding matrix is given by Equation 3 in case of $r_1 \geq r_2$ and given by Equation 4 in case of $r_1 < r_2$, UE determines the optimal phase difference for JT between two TPs by using Equation 1. After the optimal phase difference for JT is determined, UE calculates CQI for JT on the assumption that precoding matrix $P_{JT}(\hat\theta)$ is used for JT, and finally feeds back one or all of the following two values for JT:
1. Phase difference between TPs: $\hat\theta$
2. CQI for JT If a phase difference is not used as feedback information, CQI for JT is calculated and reported on the assumption that a rank for JT is $r_{JT} = \max(r_1, r_2)$ and precoding matrix for JT is $$P_{JT}(1) = \begin{bmatrix} P_1 \\ [P_2, B_{N_2 \times (r_{JT}-r_2)}] \end{bmatrix}$$

in case of $r_1 \geq r_2$ or $$P_{JT}(1) = \begin{bmatrix} \lfloor P_1, B_{N_1 \times (r_{JT}-r_1)} \rfloor \\ P_2 \end{bmatrix}$$

in case of $r_1 < r_2$.

As an alternative solution, $(N_1+N_2) \times r_{JT}$ precoding matrix $P_{JT}(\theta)$ may be considered as the following Equation 5.

$$P_{JT}(\theta) = \begin{bmatrix} P_1 \\ \theta \cdot [B_{N_2 \times (r_{JT}-r_2)}, P_2] \end{bmatrix} \quad \text{[Equation 5]}$$

Here, $\lfloor B_{N_2 \times 0}, P_2 \rfloor = P_2$ is defined. In this alternative solution, predetermined matrix $B_{N_2 \times (r_{JT}-r_2)}$ is located at the left of $P_2$, whereas $B_{N_2 \times (r_{JT}-r_2)}$ is located at the right of $P_2$ according to a previous case. In case of $r_1 < r_2$, $P_{JT}(\theta)$ is the form of the following Equation 6.

$$P_{JT}(\theta) = \begin{bmatrix} [B_{N_1 \times (r_{JT}-r_1)}, P_1] \\ \theta \cdot P_2 \end{bmatrix} \quad \text{[Equation 6]}$$

Thereafter, on the assumption that a rank for JT is $r_{JT} = \max(r_1, r_2)$ and $(N_1+N_2) \times r_{JT}$ precoding matrix for JT is given by Equation 5 in case of $r_1 \geq r_2$ and given by Equation 6 in case of $r_1 < r_2$, UE determines the optimal phase difference for JT between two TPs by using Equation 1. After the optimal phase difference for JT is determined, UE calculates CQI for JT on the assumption that precoding matrix $P_{JT}(\hat\theta)$ is used for JT, and finally feeds back one or all of the following two values for JT:
1. Phase difference between TPs: $\hat\theta$
2. CQI for JT If a phase difference is not used as feedback information, CQI for JT may be calculated and reported on the assumption that a rank for JT is $r_{JT} = \max(r_1, r_2)$ and precoding matrix for JT is $$P_{JT}(1) = \begin{bmatrix} P_1 \\ [B_{N_2 \times (r_{JT}-r_2)}, P_2] \end{bmatrix}$$

in case of $r_1 \geq r_2$ or $$P_{JT}(1) = \begin{bmatrix} \lfloor B_{N_1 \times (r_{JT}-r_1)}, P_1 \rfloor \\ P_2 \end{bmatrix}$$

in case of $r_1 < r_2$.

The third solution for $r_{JT} = \max(r_1, r_2)$ precoding matrix $P_{JT}(\theta)$ is that UE determines one of the above two solutions, based on individual CQI of TP having the maximum rank. For example, in case of $r_1 \geq r_2$, $P_{JT}(\theta)$ is determined as follows.
1. If CQI for the first codeword of TP-1 is greater than CQI for the second codeword, $P_{JT}(\theta)$ is determined according to Equation 5.
2. In the other cases, $P_{JT}(\theta)$ is determined according to Equation 3.

Thereafter, on the assumption that a rank of $r_{JT} = \max(r_1, r_2)$ and $(N_1-N_2) \times r_{JT}$ precoding matrix $P_{JT}(\theta)$ are determined on the basis of CQI of TP having the maximum rank, UE determines the optimal phase difference for JT between two TPs by using Equation 1. After the optimal phase difference for JT is determined, UE calculates CQI for JT on the assumption that precoding matrix $P_{JT}(\hat\theta)$ is used for JT, and finally feeds back one or all of the following two values for JT:
1. Phase difference between TPs: $\hat\theta$
2. CQI for JT If a phase difference is not used as feedback information, CQI for JT may be calculated and reported on the assumption that a rank for JT is $r_{JT} = \max(r_1, r_2)$ and precoder for JT is $P_{JT}(1)$.

In a general case of the CoMP measurement set having M (M is integer equal to or greater than 2) CSI-RS configurations, UE may assume that a rank for JT between M TPs, $r_{JT}$, is determined as Equation 7.

$$r_{JT} = \max(r_1, r_2, \ldots r_M) \quad \text{[Equation 7]}$$

Additionally, $(N_1+N_2+\ldots+N_M) \times r_{JT}$ precoding matrix $P_{JT}(\theta_1, \theta_2, \ldots, \theta_{M-1})$ based on individual precoding matrixes $P_1, P_2, \ldots, P_M$ may be created in the manner of stacking these M matrices and filling an empty place therein with matrices, $B_{N_m \times (r_{JT}-r_m)}$, (m=1, 2, ..., M), predetermined according to the following Equation 8.

$$P_{JT}(\theta_1, \theta_2, \ldots, \theta_{M-1}) = \begin{bmatrix} \lfloor P_1, B_{N_1 \times (r_{JT}-r_1)} \rfloor \\ \theta_1 \cdot [P_2, B_{N_2 \times (r_{JT}-r_2)}] \\ \vdots \\ \theta_{M-1} \cdot [P_M, B_{N_M \times (r_{JT}-r_M)}] \end{bmatrix} \quad \text{[Equation 8]}$$

Here, it is supposed that $\lfloor P_m, B_{N_m \times 0} \rfloor = P_m$ and TP-1 is a reference TP without loss of generality. Possible candidates of $B_{N_m \times (r_{JT}-r_m)}$, (m=1, 2, ..., M), are as follows.

1. Zero matrix having a size of $N_m \times (r_{JT}-r_m)$
2. One of $N_m \times (r_{JT}-r_m)$ precoding matrixes in a codebook for a CSI report specified in 3GPP LTE-A release 10, for example, $N_m \times (r_{JT}-r_m)$ precoding matrix having the minimum index Thereafter, on the assumption that a rank for JT is $r_{JT}=\max(r_1, r_2, \ldots, r_M)$ and $(N_1 N_2 + \ldots + N_M) \times r_{JT}$ precoding matrix for JT is by Equation 8, UE determines the optimal phase differences, $\hat{\theta}_1, \hat{\theta}_2, \ldots, \hat{\theta}_{M-1}$, for JT between M TPs by using Equation 9.

$$(\hat{\theta}_1, \hat{\theta}_2, \ldots, \hat{\theta}_{M-1}), = \underset{(\theta_1, \theta_2, \ldots, \theta_{M-1})}{\mathrm{argmax}} f(P_{JT}(\theta_1, \theta_2, \ldots, \theta_{M-1}))$$ [Equation 9]

After the optimal phase difference for JT is determined, UE calculates CQI for JT on the assumption that precoding matrix $P_{JT}(\hat{\theta}_1, \hat{\theta}_2, \ldots, \hat{\theta}_{M-1})$ is used for JT, and finally feeds back one or all of the following two values for JT:
1. Phase differences between TPs: $\hat{\theta}_1, \hat{\theta}_2, \ldots, \hat{\theta}_{M-1}$
2. CQI for JT If a phase difference is not used as feedback information, CQI for JT may be calculated and reported on the assumption that a rank for JT is $r_{JT}=\max(r_1, r_2, \ldots, r_M)$ and precoder for JT is $$P_{JT}(1,1,\ldots,1) = \begin{bmatrix} [P_1, B_{N_1 \times (r_{JT}-r_1)}] \\ [P_2, B_{N_2 \times (r_{JT}-r_2)}] \\ \vdots \\ [P_M, B_{N_M \times (r_{JT}-r_M)}] \end{bmatrix}.$$

As an alternative solution for a general case of the CoMP measurement set having M CSI-RS configurations, $(N_1+N_2+\ldots+N_M) \times r_{JT}$ precoding matrix $P_{JT}(\hat{\theta}_1, \hat{\theta}_2, \ldots, \hat{\theta}_{M-1})$ may be considered as the following Equation 10.

$$P_{JT}(\theta_1, \theta_2, \ldots, \theta_{M-1}) = \begin{bmatrix} [B_{N_1 \times (r_{JT}-r_1)}, P_1] \\ \theta_1 \cdot [B_{N_2 \times (r_{JT}-r_2)}, P_2] \\ \vdots \\ \theta_{M-1} \cdot [B_{N_M \times (r_{JT}-r_M)}, P_M] \end{bmatrix}$$ [Equation 10]

Here, it is supposed that $[B_{N_m \times 0}, P_m] = P_m$ and TP-1 is a reference TP without loss of generality. In this alternative case, predetermined matrixes of $B_{N_m \times (r_{JT}-r_m)}$, (m=1, ..., M), are located at the left of $P_m$, whereas predetermined matrix is located at the right of $P_m$ in a previous case. Thereafter, on the assumption that a rank for JT is $r_{JT}=\max(r_1, r_2, \ldots, r_m)$ and $(N_1+N_2+\ldots+N_M) \times r_{JT}$ precoding matrix for JT is by Equation 10, UE determines the optimal phase differences, $\hat{\theta}_1, \hat{\theta}_2, \ldots \hat{\theta}_{M-1}$, for JT between M TPs by using Equation 9.

After the optimal phase difference for JT is determined, UE calculates CQI for JT on the assumption that precoding matrix $P_{JT}(\hat{\theta}_1, \hat{\theta}_2, \ldots, \hat{\theta}_{M-1})$ is used for JT, and finally feeds back one or all of the following two values for JT:
1. Phase differences between TPs: $\hat{\theta}_1, \hat{\theta}_2, \ldots, \hat{\theta}_{M-1}$
2. CQI for JT If a phase difference is not used as feedback information, CQI for JT may be calculated and reported on the assumption that a rank for JT is $r_{JT}=\max(r_1, r_2, \ldots, r_M)$ and precoder for JT is $$P_{JT}(1,1,\ldots,1) = \begin{bmatrix} [B_{N_1 \times (r_{JT}-r_1)}, P_1] \\ [B_{N_2 \times (r_{JT}-r_2)}, P_2] \\ \vdots \\ [B_{N_M \times (r_{JT}-r_M)}, P_M] \end{bmatrix}.$$

The third solution for a general case of the CoMP measurement set having M CSI-RS configurations is that UE determines $(N_1+N_2+\ldots+N_M) \times r_{JT}$ precoding matrix $P_{JT}(\hat{\theta}_1, \hat{\theta}_2, \ldots, \hat{\theta}_{M-1})$ from among the above two solutions, based on individual CQI of TP having the maximum rank. For example, in case $r_m$ is the maximum rank, $P_{JT}(\hat{\theta}_1, \hat{\theta}_2, \ldots, \hat{\theta}_{M-1})$ is determined as follows.

1. If CQI for the first codeword of TP-m is greater than CQI for the second codeword, $P_{JT}(\hat{\theta}_1, \hat{\theta}_2, \ldots, \hat{\theta}_{M-1})$ is determined according to Equation 10.
2. In the other cases, $P_{JT}(\hat{\theta}_1, \hat{\theta}_2, \ldots, \hat{\theta}_{M-1})$ is determined according to Equation 8.

Thereafter, on the assumption that a rank of $(N_1+N_2+\ldots+N_M) \times r_{JT}$ precoding matrix and $r_{JT}=\max(r_1, r_2, \ldots, r_m)$ are determined on the basis of CQI of TP having the maximum rank, UE determines the optimal phase differences $\hat{\theta}_1, \hat{\theta}_2, \ldots, \hat{\theta}_{M-1}$ for JT between M TPs by using Equation 9.

After the optimal phase differences for JT are determined, UE calculates CQI for JT on the assumption that precoding matrix $P_{JT}(\hat{\theta}_1, \hat{\theta}_2, \ldots, \hat{\theta}_{M-1})$ is used for JT, and finally feeds back one or all of the following two values for JT:
1. Phase differences between TPs: $\hat{\theta}_1, \hat{\theta}_2, \ldots, \hat{\theta}_{M-1}$
2. CQI for JT If phase differences are not used as feedback information, CQI for JT may be calculated and reported on the assumption that a rank for JT is $r_{JT}=\max(r_1, r_2, \ldots, r_M)$ and precoder for JT is $P_{JT}(1,1,\ldots,1)$.

Figure 10:
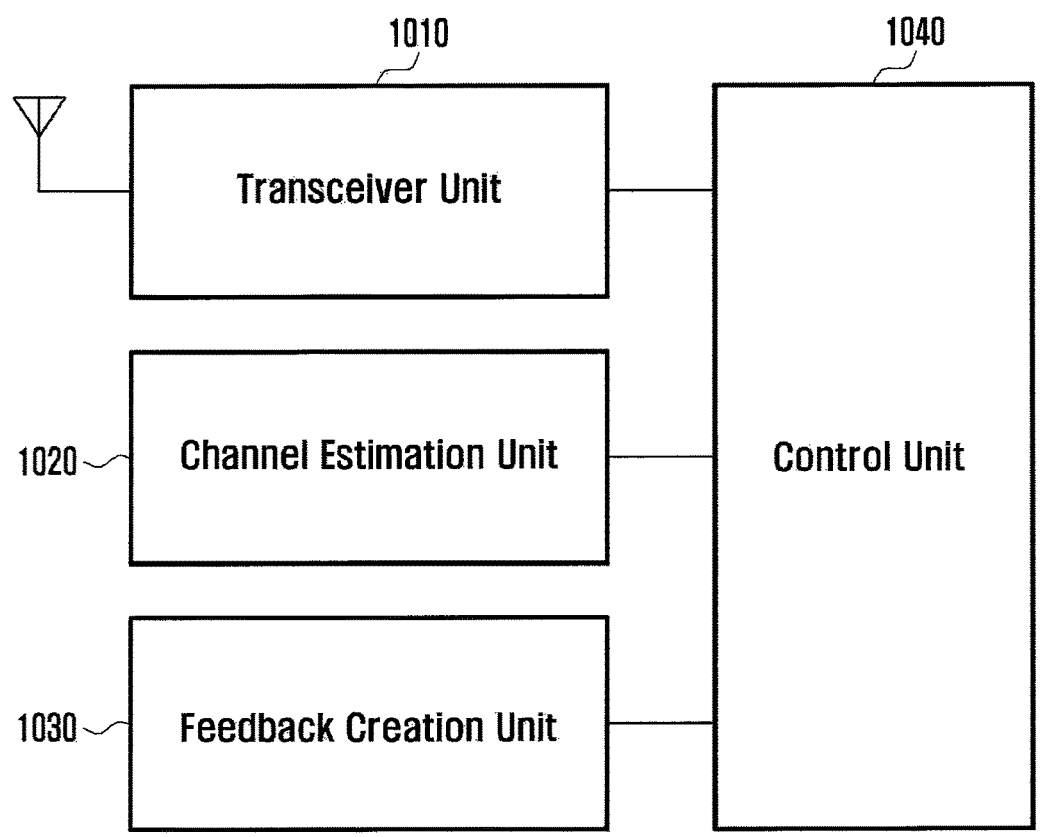
FIG. 10 is a block diagram of a device in accordance with one embodiment of the present invention.

FIG. 10 is a block diagram of a device in accordance with one embodiment of the present invention.

Core components that constitute UE are a transceiver unit 1010, a channel estimation unit 1020, a feedback creation unit 1030, and a control unit 1040. The transceiver unit 1010 is used by UE to communicate control information, data, or reference signals with eNB, especially, used to receive CSI-RS and transmit CSI feedback including one or all of phase differences for JT between TPs or CQI. The channel estimation unit 1020 is used by UE to measure CSI-RS ports allocated to UE, and the feedback creation unit 1030 is used to create, based on measurement values from the channel estimation unit 1020, individual CSI feedback for a plurality of TPs and CSI feedbacks including one of phase differences for JP between TPs or CQI. All of the above operations are controlled by the control unit 1040.

Figure 11:
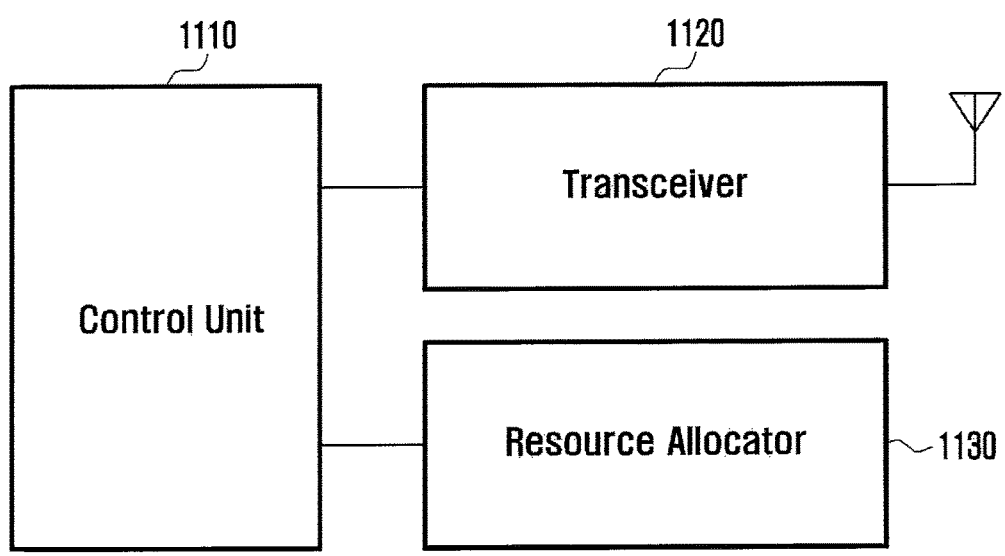
FIG. 11 is a block diagram of an eNB in accordance with one embodiment of the present invention.

FIG. 11 is a block diagram of an eNB in accordance with one embodiment of the present invention.

Core components that constitute eNB are a controller 1110, a transceiver 1120, and a resource allocator 1130. The transceiver 1120 is used by eNB to communicate control information, data, or reference signals with eNB, especially, to transmit CSI-RS and receive CSI feedback including one or all of phase differences for JT between TPs or CQI. The resource allocator 1130 is used by eNB to allocate CSI-RS configurations to UEs and also to schedule data resources to UEs, based on CSI feedbacks from UEs. All of the above operations are controlled by the controller 1110.

Figure 12:
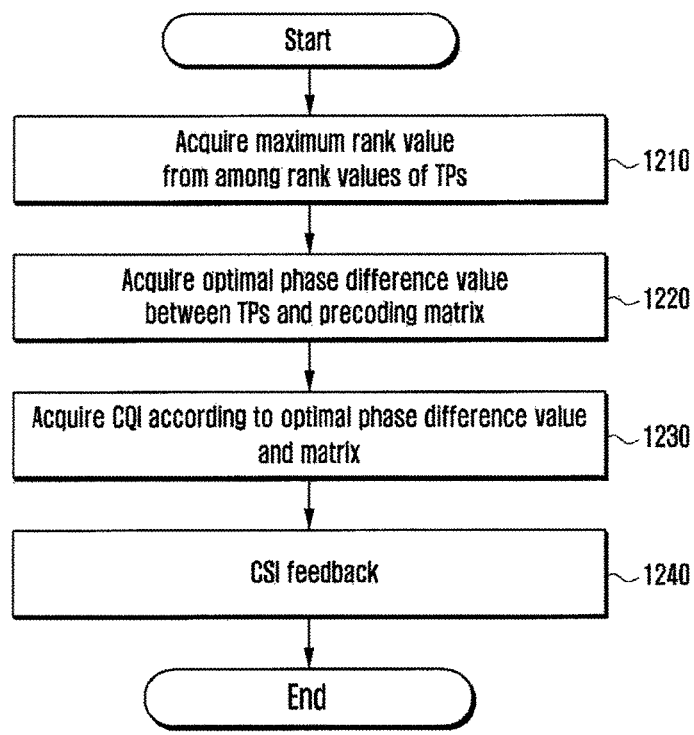
FIG. 12 is a flow diagram of a CSI feedback process in accordance with one embodiment of the present invention.

FIG. 12 is a flow diagram of a CSI feedback process in accordance with one embodiment of the present invention.

Referring to FIG. 12, at step 1210, the feedback creation unit 1030 checks rank values for a plurality of TPs associated with JT and determines the maximum value among them as a rank value. This is described above with reference to Equations 2 and 7. If rank values of all TPs are same, step 1210 may be skipped.

At step 1220, the feedback creation unit 1030 finds the optimal phase difference between a plurality of TPs according to Equation 1 or 9. Namely, the feedback creation unit 1030 finds the optimal phase difference by which a channel quality becomes the maximum according to the above-discussed embodiments. Thus, precoding matrix corresponding to the relevant phase difference is also determined.

At step 1230, the feedback creation unit 1030 acquires CQI according to the optimal phase difference of step 1220. Namely, the feedback creation unit 1030 calculates CQI on the assumption that the optimal phase difference is applied.

At step 1240, the feedback creation unit 1030 creates CSI including at least parts of the acquired RI, PMI, and CQI, and the transceiver unit 1010 transmits the created CSI. Depending on embodiments, part of RI for JT and PMI for JT may be omitted from CSI.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a Field Programmable Gate Array (FPGA) or Application Specific Integrated Circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The embodiments described above are illustrative examples and it should not be construed that the present invention is limited to these particular embodiments. Thus, various changes and modifications may be effected by one skilled in the art without departing from the spirit or scope of the invention as defined in the appended claims.

While the present invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method by a terminal, the method comprising:
receiving a plurality of channel state information (CSI)-reference signals (CSI-RSs) from a plurality of transmission points;
determining at least one CSI for each of the CSI-RSs;
determining, based on the at least one CSI, a phase difference value for the plurality of transmission points;
determining channel quality information (CQI) for the plurality of transmission points based on a precoding matrix determined by using the phase difference value; and
transmitting the at least one CSI and the CQI for the plurality of transmission points.

2. The method of claim 1, wherein determining the CQI for the plurality of transmission points further comprises:
determining a maximum rank value from a plurality of rank values of the plurality of transmission points;
determining the phase difference value based on the determined rank value; and
determining the CQI for the plurality of transmission points based on the phase difference value.

3. The method of claim 1, wherein transmitting the at least one CSI and the CQI for the plurality of transmission points comprises transmitting the the phase difference value.

4. A terminal, the terminal comprising:
a transceiver; and
a controller configured to:
receive a plurality of channel state information (CSI)-reference signals (CSI-RSs) from a plurality of transmission points;
determine at least one CSI for each of the CSI-RSs;
determine, based on the at least one CSI, a phase difference value for the plurality of transmission points;
determine channel quality information (CQI) for the plurality of transmission points based on a precoding matrix determined by using the phase difference value; and
transmit the at least one CSI and the CQI for the plurality of transmission points.

5. The terminal of claim 4, wherein the controller is further configured to:
determine a maximum rank value from a plurality of rank values of the plurality of transmission points;
determine the phase difference value based on the determined rank value; and determine the CQI for the plurality of transmission points based on the phase difference value.

6. The terminal of claim 4, wherein the controller is configured to transmit the phase difference value.

7. A method by a base station, the method comprising:
transmitting, to a terminal, a plurality of channel state information (CSI)-reference signals (CSI-RSs); and
receiving, from the terminal, at least one CSI for each of the CSI-RSs and a channel quality information (CQI) for a plurality of transmission points,
wherein the CQI for the plurality of transmission points is determined based on a precoding matrix determined by using a phase difference value for the plurality of transmission points, and
wherein the phase difference value for the plurality of transmission points is determined based on the at least one CSI.

8. The method of claim 7, wherein the phase difference value is determined based on a maximum rank value from a plurality of rank values of the plurality of base stations.

9. The method of claim 7, wherein the receiving the at least one CSI and the CQI further comprises receiving the phase difference value.

10. A base station, the base station comprising:
a transceiver; and
a controller configured to:
transmit, to a terminal, a plurality of channel state information (CSI)-reference signals (CSI-RSs); and
receive, from the terminal, at least one CSI for each of the CSI-RSs and a CQI for a plurality of transmission points,
wherein the CQI for the plurality of transmission points is determined based on a precoding matrix determined by using a phase difference value for the plurality of transmission points, and
wherein the phase difference value for the plurality of transmission points is determined based on the at least one CSI.

11. The base station of claim 10, wherein the phase difference value is determined based on a maximum rank value from a plurality of rank values of the plurality of base stations.

12. The base station of claim 10, wherein the controller is configured to receive the phase difference value.

* * * * *